United States Patent
Skudutis

[19]

[11] Patent Number: 6,158,122
[45] Date of Patent: Dec. 12, 2000

[54] VEHICLE FRAME MEMBER HAVING A SHOCK ABSORBING MOUNTING PORTION AND A METHOD FOR MAKING THE SAME

[75] Inventor: Tommy J. Skudutis, Newmarket, Canada

[73] Assignee: Cosma International Inc., Concord, Canada

[21] Appl. No.: 09/250,135

[22] Filed: Feb. 16, 1999

Related U.S. Application Data

[60] Provisional application No. 60/074,962, Feb. 17, 1998.

[51] Int. Cl.$^7$ ..................................................... B21D 53/88
[52] U.S. Cl. ..................... 29/897.2; 29/897.2; 29/421.1; 29/523; 72/55
[58] Field of Search ................................. 29/897.2, 421.1, 29/523, 522.1, 527.4; 72/61, 62, 58, 55; 296/188, 189, 205

[56] References Cited

U.S. PATENT DOCUMENTS

| | | |
|---|---|---|
| 3,681,960 | 8/1972 | Tadokoro . |
| 3,694,895 | 10/1972 | Werner .................................... 29/897.2 |
| 4,139,246 | 2/1979 | Mikoshiba et al. . |
| 4,591,492 | 5/1986 | Tanaka et al. . |
| 4,998,345 | 3/1991 | Funahashi et al. ..................... 29/897.2 |
| 5,080,334 | 1/1992 | Mihara et al. . |
| 5,185,916 | 2/1993 | Maeno et al. ........................... 29/897.2 |
| 5,397,112 | 3/1995 | Roth et al. .............................. 29/897.2 |
| 5,517,743 | 5/1996 | Liebig et al. ........................... 29/522.1 |
| 5,666,727 | 9/1997 | Rashid . |
| 5,718,048 | 2/1998 | Horton et al. . |
| 5,735,156 | 4/1998 | Yoshitomi et al. ..................... 29/421.1 |
| 5,746,079 | 5/1998 | Hettinger et al. ........................... 72/55 |
| 5,799,524 | 9/1998 | Schafer et al. ............................... 72/55 |
| 5,815,901 | 10/1998 | Mason et al. .......................... 29/421.1 |
| 5,884,386 | 3/1999 | Blacket et al. ......................... 29/522.1 |
| 5,884,722 | 3/1999 | Durand et al. .......................... 29/897.2 |

FOREIGN PATENT DOCUMENTS

0758565A1  2/1997  European Pat. Off. .
WO96/19373  6/1996  WIPO .

*Primary Examiner*—Mark Rosenbaum
*Assistant Examiner*—Trinh T. Nguyen
*Attorney, Agent, or Firm*—Pillsbury Madison & Sutro LLP

[57] ABSTRACT

The present invention relates to a method for making a vehicle frame member having a shock absorbing mounting portion constructed ad arranged to be mounted to a structural component within a motor vehicle. The method comprises hydroforming a tubular blank within a hydroforming die by supplying pressurized fluid to the hollow interior of the blank. A drawforming member is moved inwardly with respect to the cavity of the hydroforming die while the fluid is pressurized so that the drawforming member deforms a portion of the tubular wall inwardly to form a recessed portion having an annular side wall portion and a bottom wall portion. The formed tubular blank is then removed from the hydroforming die and a mounting structure is disposed inside the recessed portion and the blank and mounting structure are then disposed within an injection molding die. Molten shock absorbing material is injected into the recessed portion so that the molten material surrounds the mounting structure. The molten shock absorbing material is thereafter solidified. Preferably, a pair of such recessed portions are formed. The present invention also relates to a vehicle frame member to be joined to a structural component in shock absorbing relation.

15 Claims, 10 Drawing Sheets

VEHICLE FRAME MEMBER HAVING A SHOCK ABSORBING MOUNTING PORTION AND A METHOD FOR MAKING THE SAME

The present application claims priority from U.S. Provisional Patent Application of Skudutis, Ser. No. 60/074,962, filed Feb. 17, 1998, the entirety of which is hereby incorporated into the present application by reference.

FIELD OF THE INVENTION

The present invention relates to a vehicle frame member having a shock absorbing mounting portion and a method for making the same.

BACKGROUND OF THE INVENTION

To provide a conventional vehicle frame member with a shock absorbing mounting portion, the frame member is first formed into its desired configuration by hydroforming, stamping, or some other suitable method and then a hole is formed in the wall of the frame member during a secondary punching or piercing operation. A cup-shaped bushing comprising a cup-shaped exterior can filled with solidified rubber or other suitable shock absorbing material is then welded or press-fit inside the hole. This conventional method is used instead of drawforming the exterior can directly from the frame member wall due to the space restrictions inside the pre-formed tubular member. Specifically, drawforming an integral cup-shaped wall from the wall of the pre-formed tubular member cannot be accomplished because the female die half necessary for such drawforming cannot be removed after the drawforming operation is complete.

The problem with this type of arrangement is that numerous steps must be undertaken to properly mount the bushing, thus increasing manufacturing time and costs. Also, the tolerances between the bushing exterior and the hole formed in the wall must be kept within a certain range to ensure that failure does not occur as a result of the bushing being pulled out.

SUMMARY OF THE INVENTION

It is therefore an object of the present invention to provide a vehicle frame member with a shock absorbing mounting portion which is manufactured using less operations and components in comparison to the conventional method described above and thereby realizing reduced manufacturing costs. To achieve this objective, one aspect of the present invention provides a method for making a motor vehicle frame member having a shock absorbing mounting portion.

The method comprises disposing a tubular blank in a the mold cavity of a hydroforming die. The die has interior surfaces defining the mold cavity and a reciprocating drawforming member. The blank is hydroformed by supplying pressurized fluid to the interior of the blank to expand the blank against the interior surfaces defining the mold cavity. The drawforming member is moved inwardly with respect to the cavity so that the drawforming member deforms a portion of the tubular wall blank to form a recessed portion in the blank.

The blank is removed from the hydroforming die and a mounting structure constructed and arranged to be joined with the aforesaid structural component of the motor vehicle is disposed within the recessed portion. The tubular blank with the mounting structure inside the recessed portion is then disposed in an injection molding die.

Molten shock absorbing material is injected into the recess in surrounding relation to the mounting structure and thereafter solidified.

The method of the present invention provides a vehicle frame member in which tolerance problems between the shock absorbing mounting structure and the tubular member are eliminated. Further, the manufacturing time and tooling associated with forming a separate shock absorbing mounting structure are also eliminated because the recessed portion is formed in the hydroforming die and the shock absorbing material is injected directly into the recessed portion. Thus, the resulting frame member is not only of superior quality in comparison to a frame member produced by the conventional method, the cost of manufacturing such a frame member is significantly reduced.

Another aspect of the present invention provides a vehicle frame member to be joined to another structural component within a motor vehicle in shock absorbing relation. The frame member comprises a hydroformed tubular member having a main tubular wall portion surrounding a hollow interior and a recessed portion extending inwardly toward the hollow interior. The recessed portion is formed integrally with the main tubular wall portion. Mounting structure is disposed inside the recessed portion and is constructed and arranged to enable the vehicle frame member to be mounted to the structural component within the motor vehicle. Solidified shock absorbing material is disposed inside the recessed portion and surrounds the mounting structure such that the mounting structure can be resiliently mounted to the aforesaid structural component in a manner that permits limited relative movement between the hydroformed tubular member and the mounting structure and hence between the hydroformed tubular member and the structural component.

The frame member of the present invention does not suffer the push/pull out failures of frame member constructed in accordance with the conventional method described above because the recessed portion is deformed from the tubular wall portion with the annular side wall portion being formed integrally with the tubular wall portion. Thus, any push/pull out failure between the mounting portion of the frame member of the present invention and the tubular wall portion would require that shearing take place between the annular side wall portion and the tubular wall. This secure relation is superior to the conventional welding or press-fit provided by the conventional method.

Other objects, features, and advantages of the present invention will become apparent from the following detailed description, the accompanying drawings, and the appended claims.

DETAILED DESCRIPTION OF THE PREFERRED EMBODIMENT OF THE INVENTION

Figure 1:
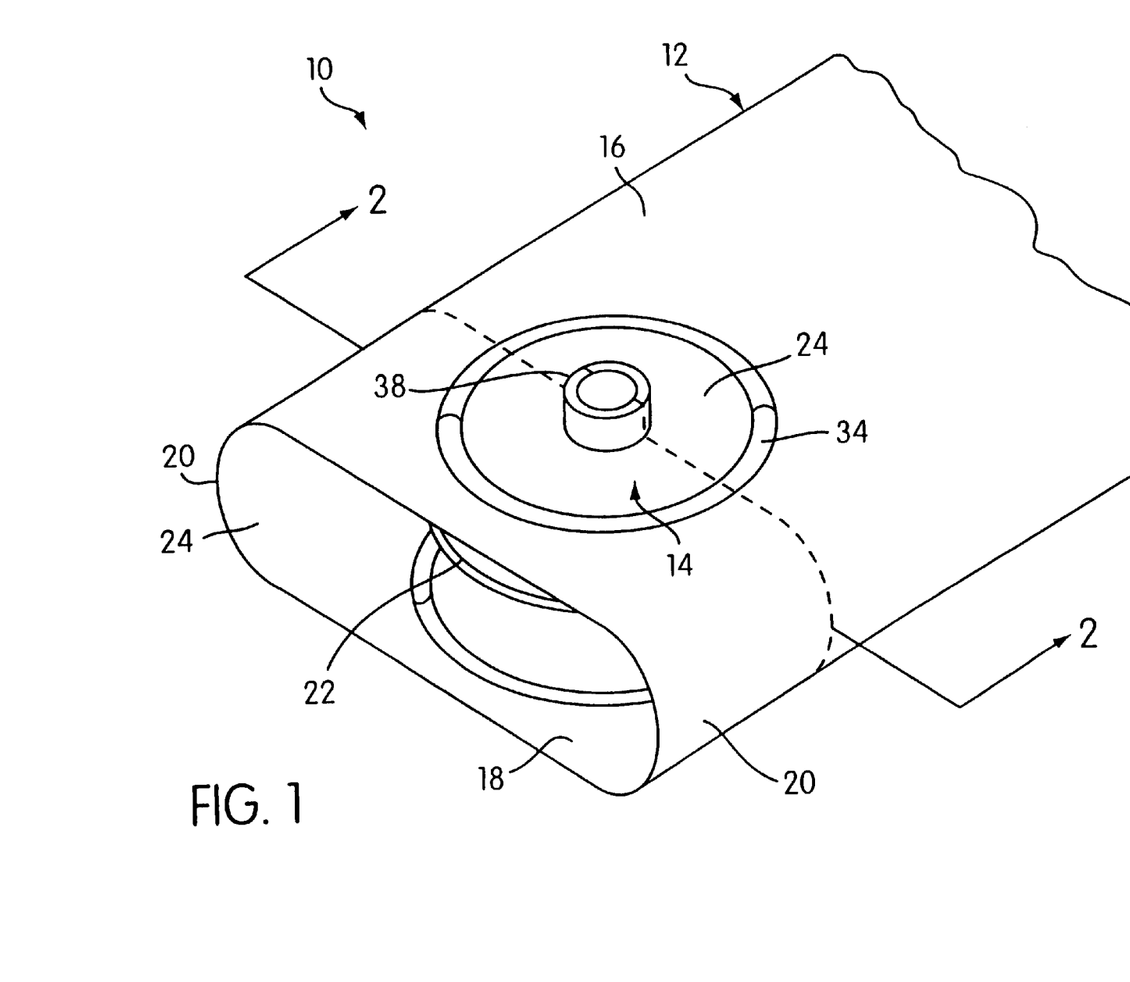
FIG. 1 is an isometric view of a hydroformed vehicle frame member with a shock mounting portion constructed in accordance with the principles of the present invention.
Figure 2:
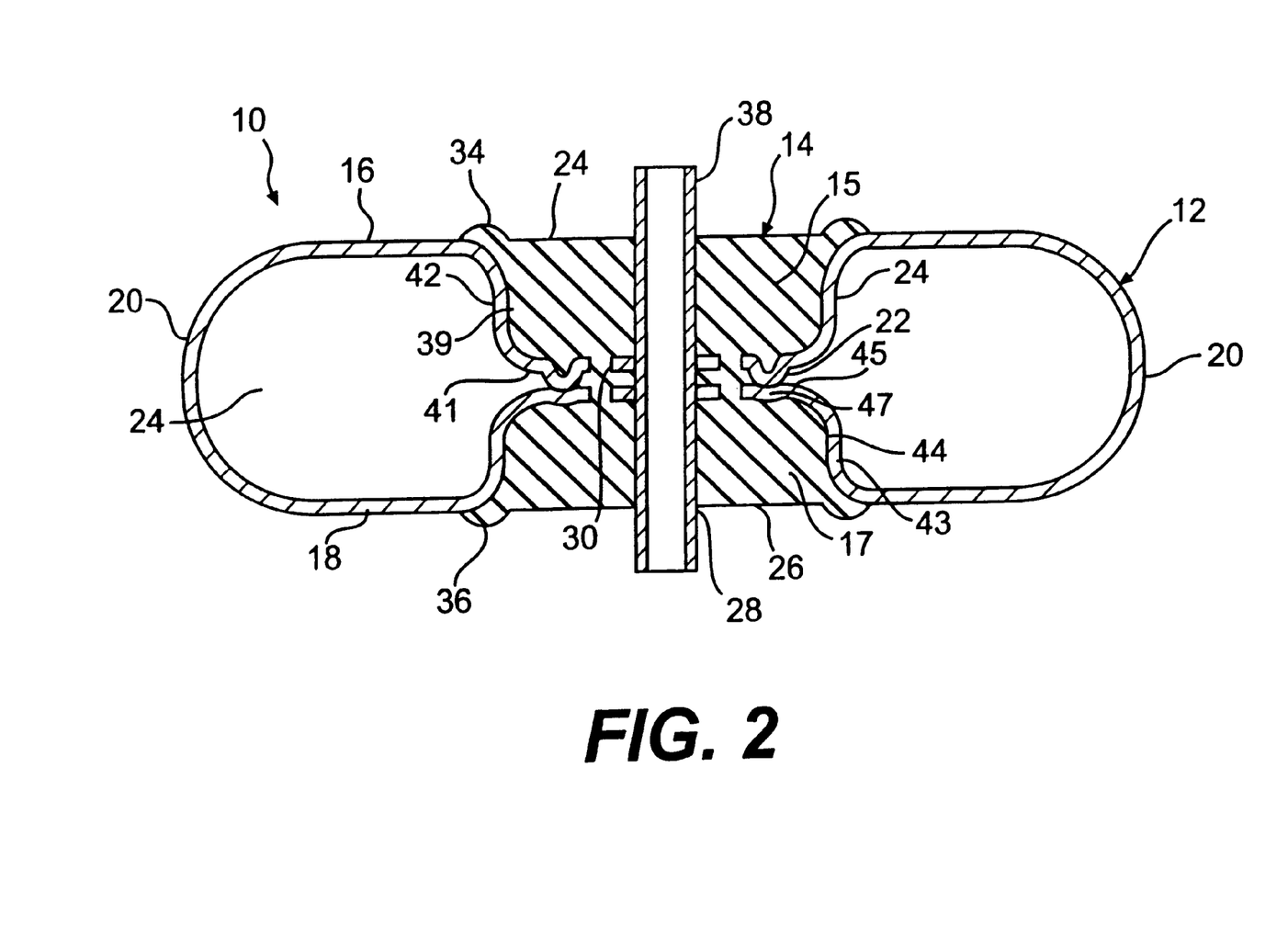
FIG. 2 is a cross-sectional view taken along the line of 2—2 in FIG. 1.

FIGS. 1 and 2 show a hydro-drawformed vehicle frame member, generally indicated at 10, manufactured in accordance with the principles of the present invention. The hydro-drawformed frame member 10 has an integral shock absorbing mounting portion, and comprises two main components: a hydro-drawformed tubular blank, generally indicated at 12, and a shock absorbing mounting portion, generally indicated at 14. The tubular blank member 12 has a metal tubular wall of rectangular, irregular, or somewhat oval cross section. The tubular wall surrounding a hollow interior includes a generally flat upper wall portion 16 and a generally flat lower wall portion 18. Curved side wall portions 20 are continuous with the upper wall portion 16 and the lower wall portion 18.

Referring to FIG. 2, the upper wall portion 16 has an upper cup-shaped recessed portion 42 formed therein with a drawn annular side wall portion 39 formed integrally with the upper wall portion 16 and a bottom wall portion 41 formed integrally with the side wall portion 39. The lower wall portion 18 has a lower cup-shaped recessed portion 44 formed therein with a drawn annular side wall portion 43 formed integrally with the lower wall portion 18 and a bottom wall portion 47 formed integrally with the side wall portion 43. The bottom wall portion 41 of the upper recessed portion 42 has an annular sealing lip 22 which is sealingly engaged with the adjacent internal flat surface 45 of the bottom wall portion 47 of the opposing recessed portion 44. As will be appreciated later in the application, the annular sealing lip 22 provides an annular seal which partly defines a cavity to be filled with molten shock absorbing material.

The shock absorbing mounting portion 14 includes upper and lower disks 15 and 17, respectively, made of a suitable injection molded shock absorbing material, such as rubber or another resilient, yieldingly deformable material. The upper disk 15 is disposed inside the upper recessed portion 42, and includes a circular shaped top surface 24 and an upper annular ridge 34 extending around the periphery of the top surface 24. The lower disk 17 is disposed inside the lower recessed portion 44, and includes a circular shaped bottom surface 26, and a bottom annular ridge 36 extending around the periphery of the bottom surface 26. A mounting structure in the form of an internally threaded mounting sleeve 38 is inserted through a central bore 28 extending through the center of the upper disk 15, through the bottom wall portions 41, 47 of each recessed portion 42, 44, and through the lower disk 17. The sleeve 38 receives a fastening bolt for securing the vehicle frame member 10 in shock absorbing relation to another vehicle frame member or some other structural component within the motor vehicle. Specifically, it is contemplated the sleeve 38 could serve as a mounting point for an engine cradle or a suspension arm. The sleeve 38 could also be joined with any other vehicle frame members or structural components within the vehicle, such as body components, chassis component, engine cradle components, etc.

When the sleeve 38 is joined with or mounted to a structural component within the motor vehicle in shock absorbing relation, the rubber disks 15, 17 allow limited relative movement between the sleeve and the tubular member 12. As a result, limited relative movement is permitted between the frame member 10 and the structural component during vehicle operation so that the forces are not transmitted directly to the tubular member 12. Instead, the rubber disks 15, 17 will absorb a portion of the forces.

A plurality of circumferentially spaced openings or holes 30 are formed in the bottom wall portions 41, 47 of the upper and lower recessed portions 42, 44. The holes 30 are disposed in concentric surrounding relation to central bore 28 and inside the annular seal formed between annular sealing lip 22 and the engaging surface 45. Preferably, the holes 30 in the bottom wall portion 41 of the recessed portion 42 are each substantially aligned with an associated hole 30 in the bottom wall portion 47 of the recessed portion 44. The holes 30 provide a passage for molten shock absorbing material to pass between the recessed portions 42, 44 during the injection molding process which will be described later in the application. The longitudinal end portions of the mounting sleeve 38 protrude above the top surface 24 and below the bottom surface 26.

Figure 3:
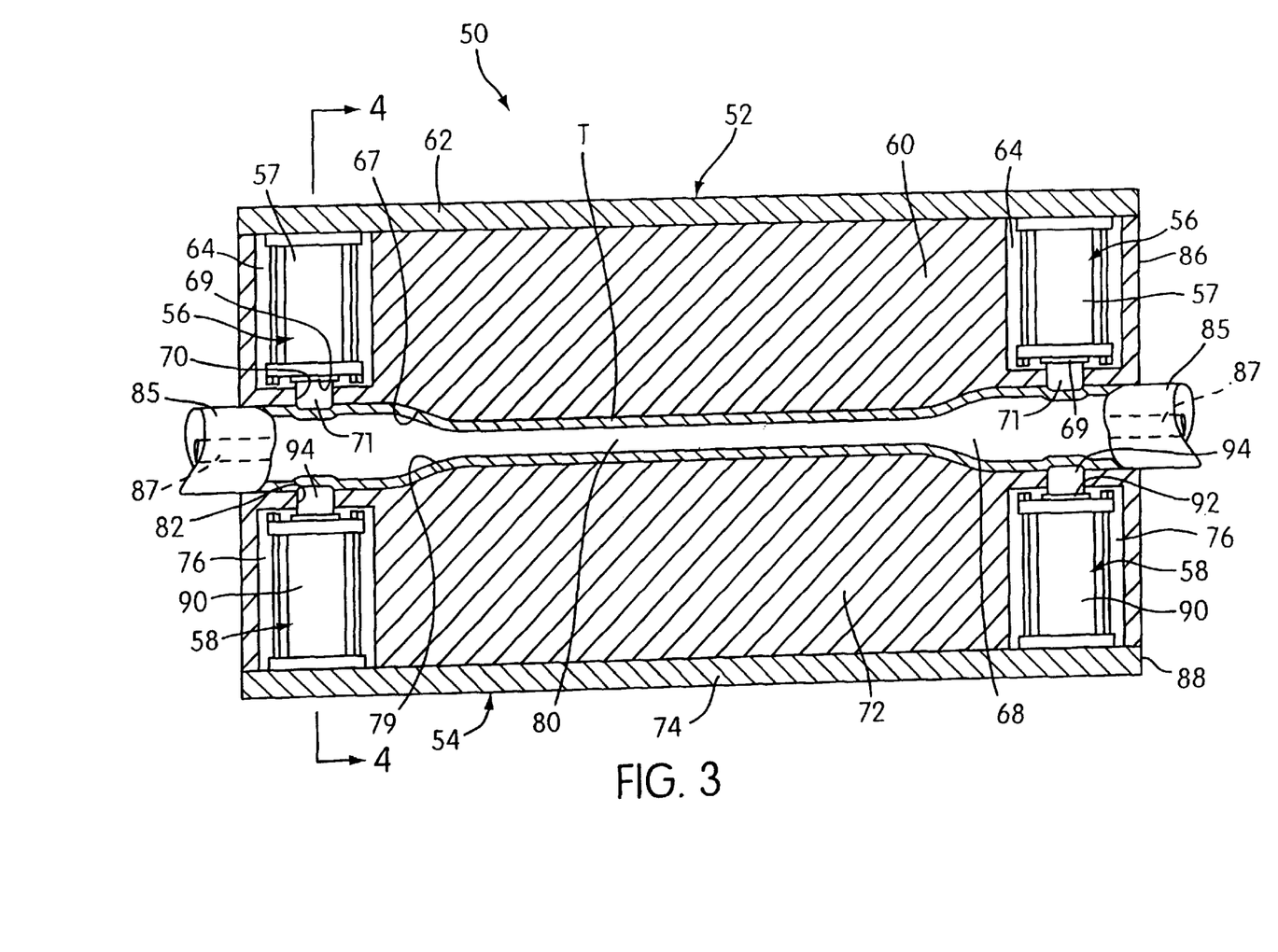
FIG. 3 is a longitudinal sectional view of an embodiment of a hydroforming assembly in accordance with the present invention and showing the upper and lower hydroforming die halves engaged with a 10 tubular blank, ram cylinders engaged with the opposite and portions of the tubular blank, and upper and lower drawforming members retracted.

FIG. 3 shows a hydro-drawforming assembly, generally indicated at 50, for use in accordance with the principles of the present invention. The assembly 50 is used to form two separate hydro-drawformed tubular blanks 12 for two separate vehicle frame members 10. The hydro-drawforming assembly 50 includes a hydroforming die with an upper hydroforming die half, generally indicated at 52, and a lower hydroforming die half, generally indicated at 54. The upper hydroforming die half 52 includes a pair of upper drawforming members generally indicated at 56, and the lower hydroforming die half 54 includes a pair of lower drawforming members generally indicated at 58. Preferably, the drawforming members 56, 58 are hydraulically driven drawforming piston cylinders, as shown.

The upper die half 52 includes a large metallic main block 60, and a top mounting plate 62 fixedly secured to the top of the main block 60. A pair of upper cylinder compartments 64 are formed within the upper main block 60 and disposed near its longitudinal ends. The drawforming cylinders 56 are fixedly mounted on the mounting plate 62 and received within compartments 64.

Figure 4:
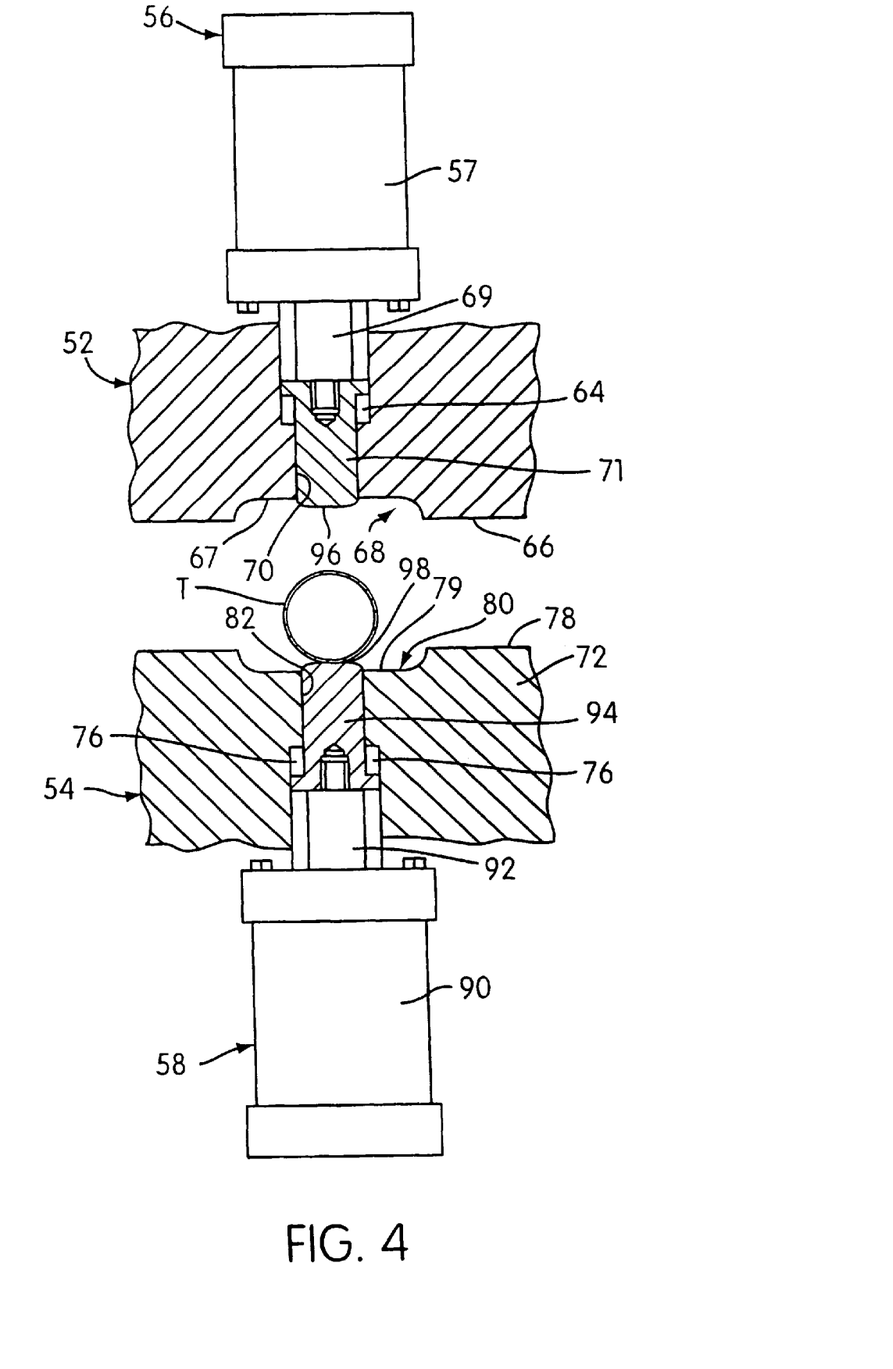
FIG. 4 is a schematic partial cross-sectional view taken along the line 4—4 in FIG. 3, but showing the upper hydroforming die half in a raised or opened position.

The upper hydroforming die half 52 has a lower interior surface, a concave portion 67 of which defines part of a die cavity 68 (see FIG. 4). The lower hydroforming die half 54 has an upper interior surface, a concave portion 79 of which defines a part of the die cavity 68 in cooperation with concave portion 67 of the upper hydroforming die half 52. The cavity 68 is elongated and has an irregular, oval or rectangular cross-sectional configuration. The upper hydroforming die half 52 is fixed by conventional means to a conventional reciprocating hydraulic press (not shown) disposed above the top plate 62 of the upper die half 52 for opening and closing movements with respect to the lower hydroforming die half 54.

The lower die half 54 includes parts corresponding to those of the upper die half 52 but inverted with respect thereto. The lower die half 54 has a main block 54 similar to the main block 60 of the upper die half 52 and disposed beneath the upper die half 52. The main block 72 is mounted on a lower die half mounting plate 74. Two lower cylinder compartments 76 disposed in the lower die half main block 72 near the longitudinal ends of the block 72. The lower cylinder compartments 76 are arranged directly beneath the upper cylinder compartments 64 disposed in the upper die half main block 60. Lower drawforming members in the form of hydraulically driven drawforming cylinders 58 are fixedly mounted on the lower die mounting plate 74 and disposed within compartments 76. The lower hydroforming die half 54 is secured by conventional means to a conventional stationary press bed (not shown) of the hydraulic press.

The size and configuration of the die cavity 68 is predetermined to define the shape of a desired tubular frame member to be formed during the hydroforming process. As can be appreciated from the embodiment illustrated in FIGS. 4 and 5, the die cavity 68 has a somewhat oval cross section, having a greater width than height. The height at a central portion 80 of the die cavity 68, while maintaining the oval shape, is smaller than at longitudinal end portions of the cavity 68.

FIG. 3 depicts the end portions of a pair of hydraulically driven ram cylinders 85 engaged with the opposite longitudinal end portions of the tubular blank T to seal the hollow interior thereof. Each ram cylinder end portion 85 has a central bore 87. One of the bores 87 is sealed while the other is connected with a fluid intensifier so that a substantially incompressible hydroforming fluid can be injected into the hollow interior of the tubular blank T. The fluid within the tubular blank T is pressurized by the intensifier so as to expand the diameter of the tubular blank T until the exterior configuration of the blank T conforms to the interior surfaces 67, 79 defining die cavity 68. While the fluid is pressured, the ram cylinders 85 are forced longitudinally inwardly towards one another so as to cause the metal material of the blank T to flow to maintain the wall thickness of the hydroformed blank within ±10% of the original wall thickness.

The upper drawform cylinders 56 each includes a hydraulic cylinder chamber 57 and an extensible and retractable piston rod 69. The lower drawform cylinders 58 are disposed within lower cylinder compartments 76 and each includes a hydraulic cylinder chamber 90 and an extensible and retractable piston rod 92. The piston rods 69, 92 reciprocate with respect to the fixed cylinder chambers 57 under the controlled force of hydraulic oil supplied under pressure to the chambers 57, 90 as will be appreciated by those skilled in the art. The piston rods 69 and 92 have cylindrical punch members 71 and 94, respectively, fixed to distal end portions thereof. When the piston rods 69 and 92 are extended, the punch members 71 and 94 extend into the die cavity 68 to perform a drawforming function which is described later.

FIGS. 4 to 10 generally illustrate the hydro-drawforming process of the present invention.

In FIG. 4, the upper and lower drawforming punches 71, 94 are shown in their retracted positions with the upper drawform punches 71 extending through holes 70 in the upper die main block 60 and into the die cavity 68 and the lower drawform punches 94 extending through holes 82 in the lower die main block 72 and into the die cavity 68 in opposing relation to the upper punches 71. The tubular blank T is loaded into position on the lower hydroforming die half 54.

Figure 5:
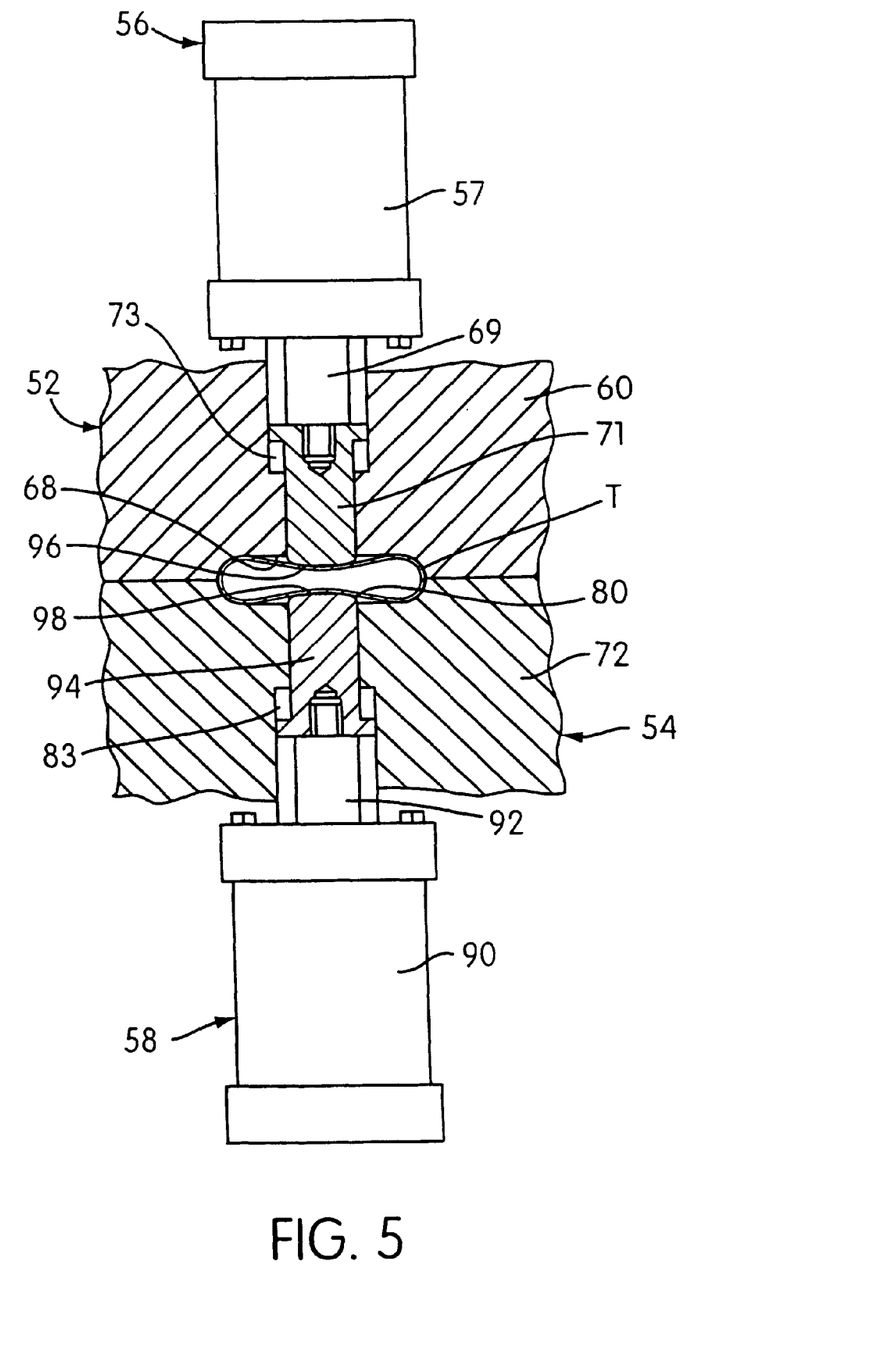
FIG. 5 is a view similar to FIG. 4, but showing the hydroforming die halves closed and the tubular blank initially deformed into an ovular shape.

In FIG. 5 the hydroform press upper die half 52 has been lowered onto the lower die half 54, deforming the tubular blank T into an irregular oval cross-sectional configuration along most of its longitudinal extent. The hydroform press is kept closed under extreme pressure.

Figure 6:
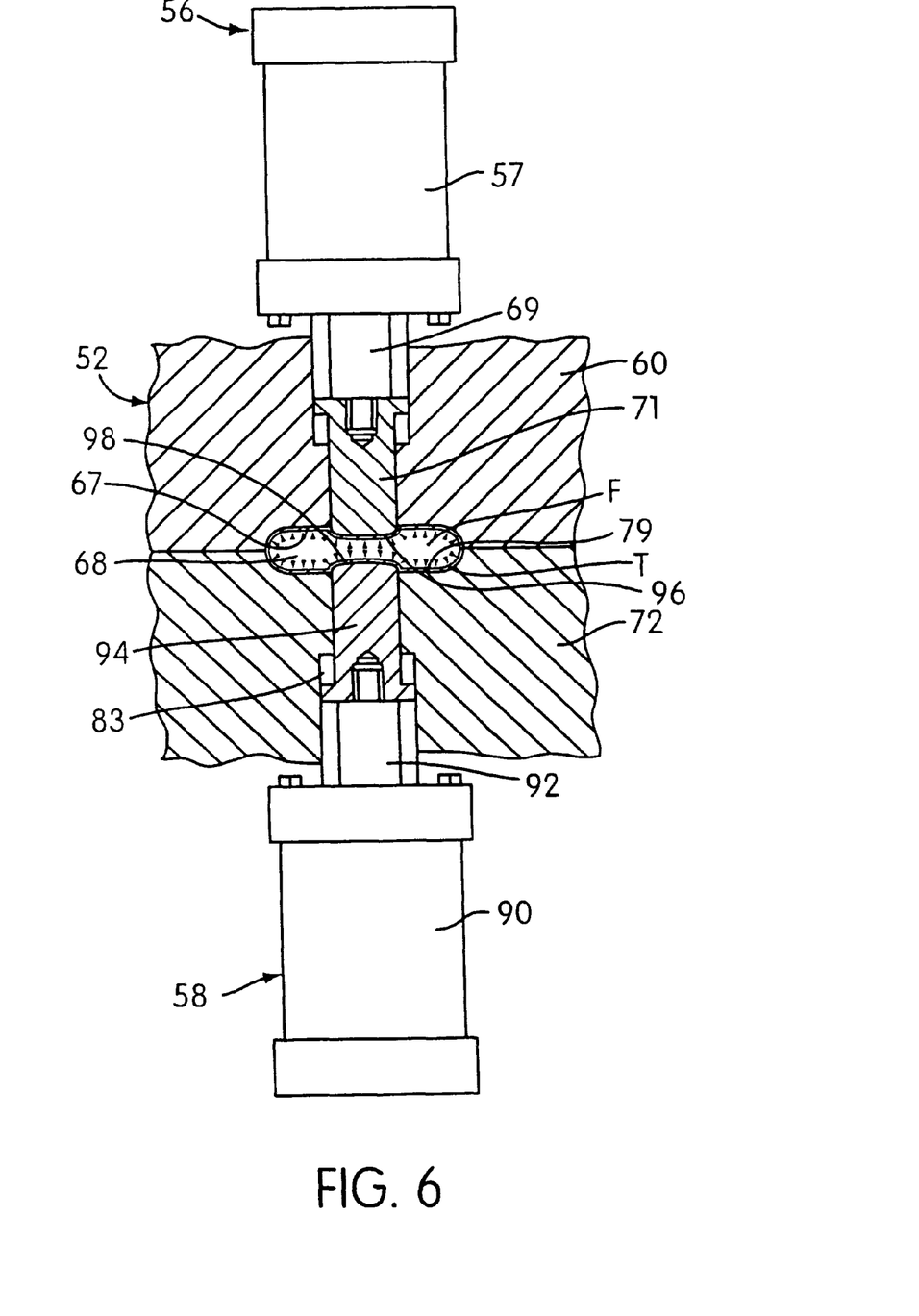
FIG. 6 is a view similar to FIG. 5, but showing internal fluid pressure expanding the diameter of the tubular blank.

In FIG. 6, the ram cylinders 85 are sealingly engaged with the opposing end portions of the blank T and a substantially incompressible hydroforming fluid F is delivered to the hollow interior of the blank T through orifice 87 in one of the ram cylinders 85. The fluid F is pressurized to diametrically expand the wall of the blank T outwardly against the interior surfaces 67, 79 which define cavity 68. Hydraulic pressure drives rams 85 inwardly towards one another to maintain the wall thickness of the wall of blank T as the wall is being diametrically expanded. The upper and lower drawform punches 71, 94 remain in their respective retracted positions, and the wall of blank T deforms over the slightly protruding distal end portions 96, 98 of the upper and lower drawform punches 71, 94.

Figure 7:
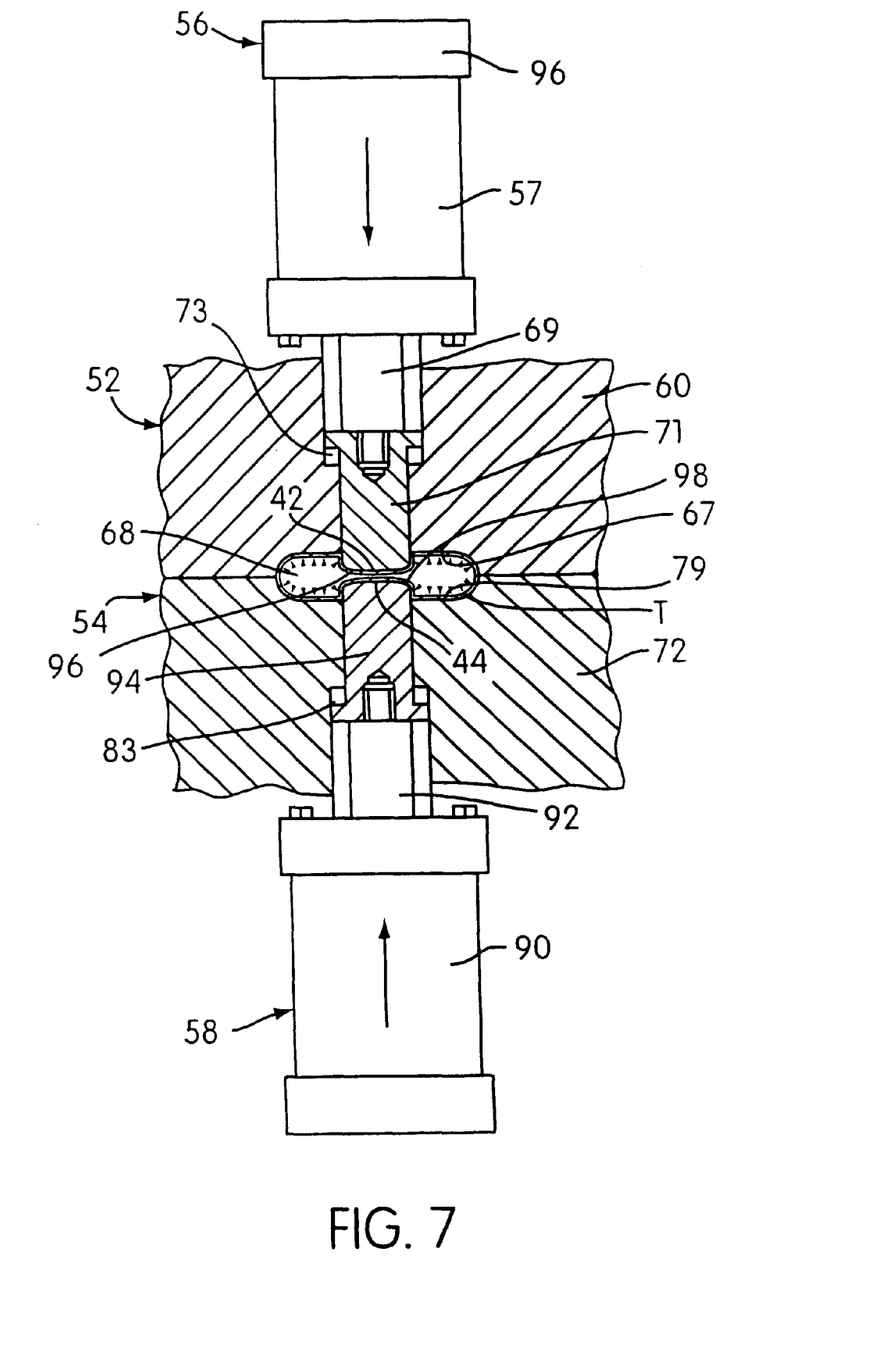
FIG. 7 is a view similar to FIG. 6, but showing the drawforming members of the hydroforming assembly moving generally inwardly towards one another.

FIG. 7 illustrates the drawforming of the cup-shaped recessed portions 42, 44. First, the internal fluid pressure is reduced slightly a selected level to allow material movement of the hydroformed blank T. The upper and lower drawform cylinders 57, 90 are pressurized to extend the upper and lower piston rods 69, 92 inwardly toward one another so that the drawform punches 71, 94 push the generally opposed wall portions of the hydroformed tubular blank T generally inwardly toward one another to substantially equal predetermined depths so as to form the recessed portions 42, 44. The reduced internal fluid pressure provides internal support for the tubular blank T so that the recessed portions 42, 44 are localized at the areas which are in contact with the drawform punches 71, 94. The surfaces of the punches 71, 94 should be sufficiently smooth, with rounded edges or corners, to prevent the punches 71, 94 from piercing or cutting the tubular blank T.

With the recessed portions, 42, 44 drawformed as described above, the bottom wall portion 41, 47 of each recessed portion 42, 44 will be spaced apart from one another. This is preferred so that the wall thicknesses of the bottom wall portions of the recessed portions 42, 44 are not thinned by compression between the punches 71 and 94. However, it is within the scope of the present invention to engage the bottom wall portions 41, 47 together. The blank T has now been conveniently hydroformed and drawformed in accordance with the principles of the present invention while occupying the same position in the same piece of equipment.

Figure 8:
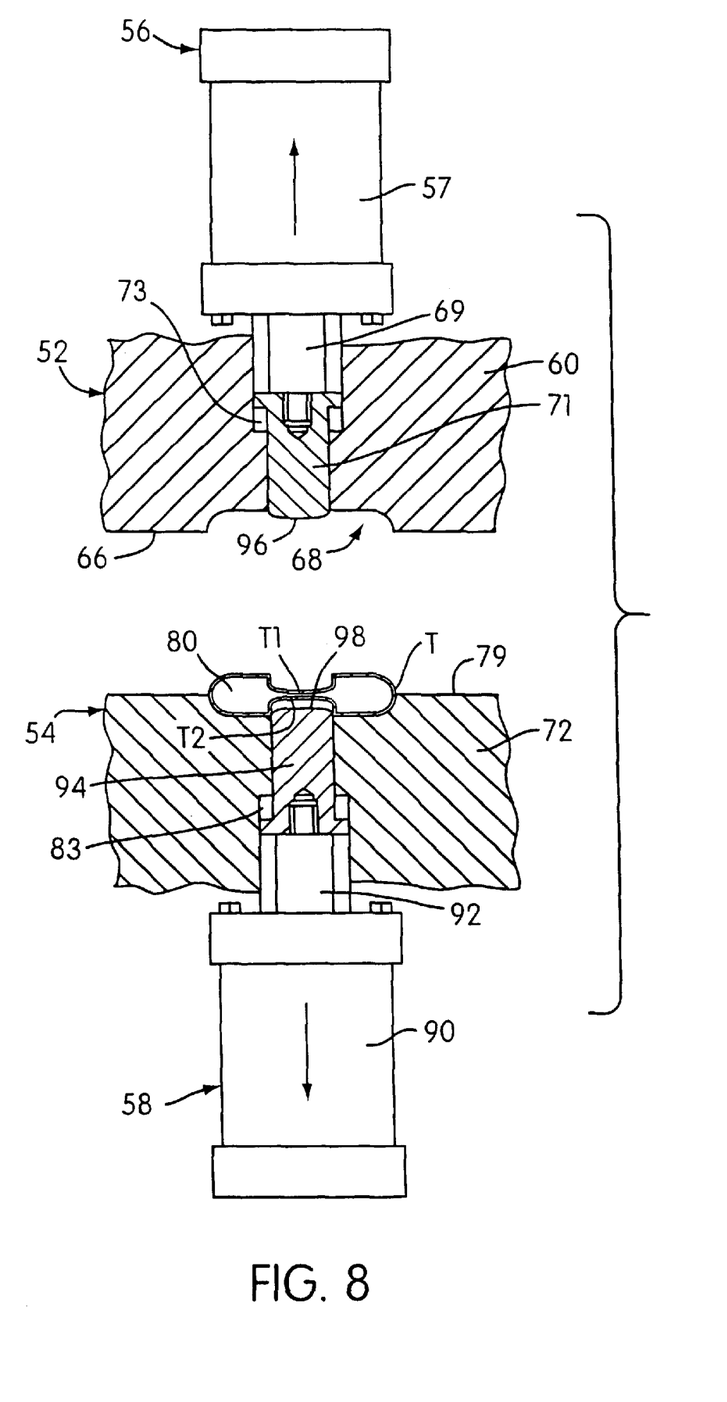
FIG. 8 is a view similar to FIG. 7, but showing the drawforming members retracted, and the upper and lower hydroforming die halves separated for removal of the hydro-drawformed tubular blank.

In FIG. 8 the internal fluid pressure is released and the fluid is allowed to drain from the hydro-drawformed tubular blank T. The upper drawform cylinders 57 and lower drawform cylinders 90 are now pressurized in a manner which retracts the upper piston rods 69 and lower piston rods 92 and associated punches 71 and 94. The upper press ram is moved upwards to lift the upper die half 52 from the lower die half 54. The hydro-drawformed blank T is then removed from the hydro-drawforming assembly 50 and placed on racking to be moved to the next operation.

The tubular blank T can be cut in half to form two substantially identical tubular members 12 which can be used individually in an injection molding operation to form two separate vehicle frame members 10 of the type illustrated in FIG. 1. The tubular blank T can also be injection molded prior to such cutting. Alternatively, the present invention contemplates that only one tubular member need be hydroformed and drawformed at a time. In such a method, a shorter tube blank T is used, and only one upper die cylinder 56 and one lower die cylinder 58 would be used in the hydro-drawforming assembly 50.

Figure 9:
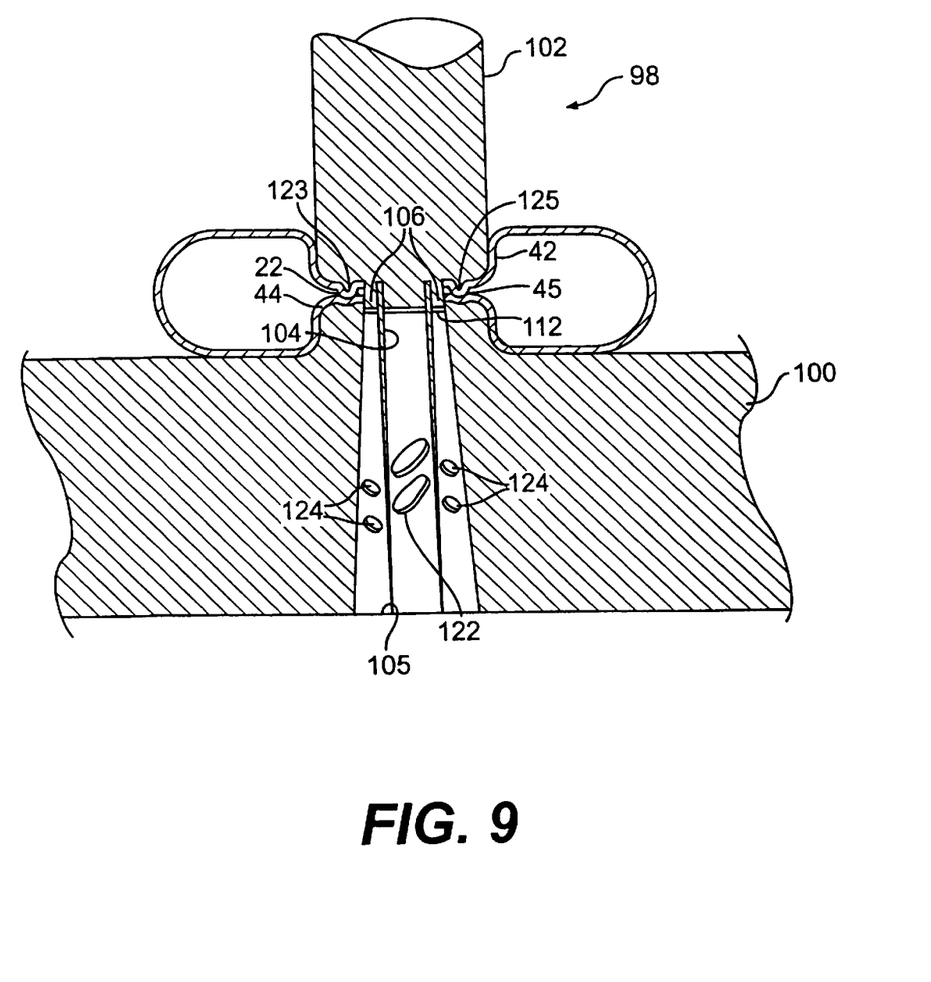
FIG. 9 is a cross-sectional view showing bottom wall portions of the recessed portions of the hydro-drawformed tubular blank being pierced by a punch tool.

In FIG. 9, the cut hydro-drawformed tubular member 12 is placed in a piercing assembly 98. The tubular member 12 is placed at a preset position on a lower die 100, which is fixedly mounted to a press bed. A punch tool 102, which is mounted to a movable upper press ram (not shown), moves in a generally vertical reciprocating motion and is engaged to start its downward stroke. Fixed to the forward end of the punch tool 102 is a central tubular cutting or hole-forming member 104 having a sharpened circular cutting edge 105. Two or more smaller circular cutting or hole-forming members 106 are formed integrally with punch tool 102 and disposed in abutting or adjacent relation on diametrically opposing sides of the central cutting member 104. The punch tool 102 is lowered and the cutting edge 105 cuts substantially aligned holes or openings in the center of the bottom wall portions 41, 47 of recessed portions 42, 44.

The punch tool 102 continues downward until the smaller cutting members 106 come into contact with the bottom wall portions 41, 47 of the recessed portions 42, 44 and form two or more pairs of substantially aligned holes on opposite sides of the aligned holes formed by cutting edge 105. This results in a central hole 114 and two or more smaller holes 116 on opposite sides of central hole 114 being cut into the recessed portion 42, and a lower central hole 118 and two or more smaller holes 120 on opposite sides of hole 118 being cut in the recessed portion 44. Scrap slugs 122 punched from central holes 114, 118, and slugs 124 punched from smaller holes 116, 120 are pushed through and ejected out of the bottom of the die 100. The smaller holes 116, 120 form the aforementioned holes 30 in the finished product. The central holes 114 and 118 form part of the central bore 28 described above.

The punch tool 102 continues its downward stroke to a predetermined depth. The punch tool 102 has an annular lip-forming ridge 123 radially outwardly spaced from circular cutting members 106. The lip-forming ridge 123 cooperates with the lower die 100 to form an annular groove 125 in the bottom wall portion 41 of the recessed portion 42. The groove 125 forms the annular sealing lip 22 in the finished product and is brought into sealing contact with the bottom wall portion 47 of the recessed portion 44. This punching and seal formation completes the construction of the tubular member 12 of the vehicle frame member 10. After the punch tool 102 has reached its preset depth, the press ram and punch 102 move upward to the home position, and the pierced hydro-drawformed tubular member 12 is removed from the lower die 100.

It is within the scope of the present invention to form the annular seal between the bottom wall portions 41, 47 of the recessed portions 42, 44 during the hydroforming operation. To do so, one of the drawforming punches 71, 94 would have a lip-forming ridge (not shown) and the other drawforming punch 71, 94 would have a groove (not shown). Like the punch tool, the drawform punches 71, 94 press the bottom wall portions together so that the ridge and groove cooperate to form an annular sealing lip on one of the bottom wall portions 41, 47.

Figure 10:
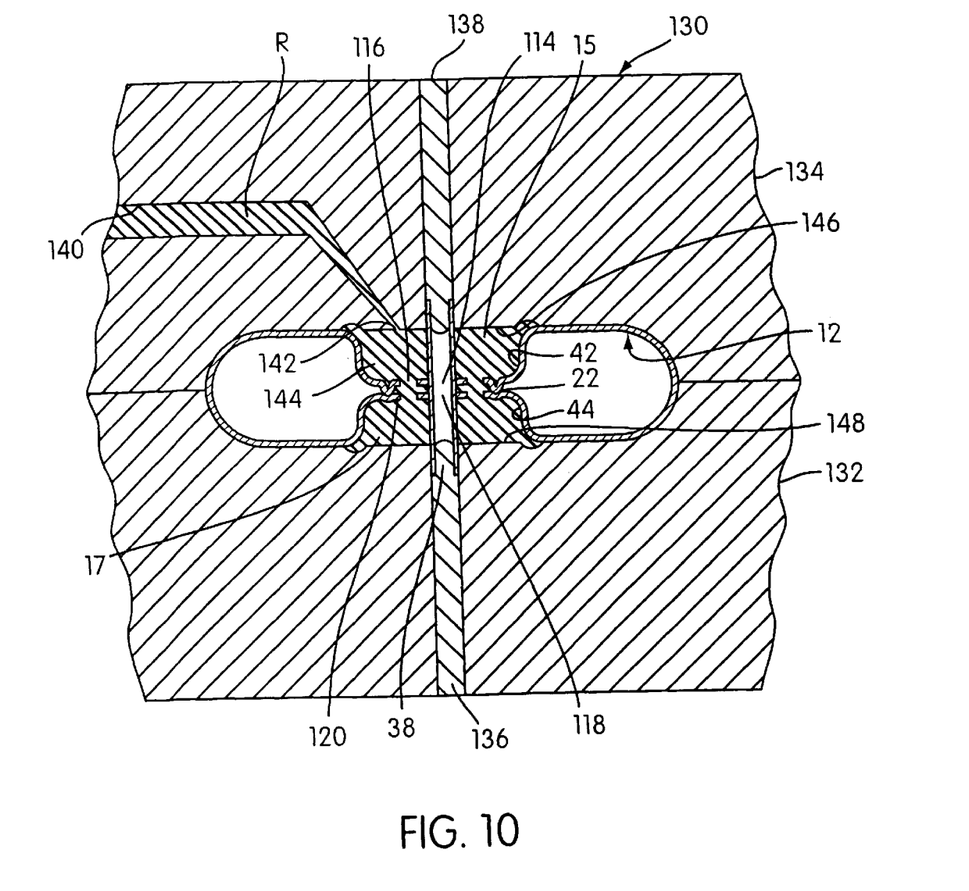
FIG. 10 is a cross-sectional view depicting the hydro-drawformed tubular blank disposed in an injection molding die and being injected with a shock absorbing material such as a rubber compound.

In FIG. 10, the pierced hydro-drawformed tubular member 12 has been moved to an injection molding station where it is placed in an injection molding die 130. The mounting sleeve 38 (See FIGS. 1, 2) is inserted through the upper central hole 114 and lower central hole 118 of the hydro-drawformed tubular member 12. The lower longitudinal end portion of the mounting sleeve 38 is inserted over the rounded upper end of a lower locating core pin 136 in lower injection molding die half 132. The upper injection molding die half 134 is then lowered onto lower molding press die half 132, and the rounded lower end of an upper locating core pin 138 is received within the upper longitudinal end portion of the mounting sleeve 38.

A molten shock absorbing material, such as a plastic or rubber compound R, is injected into the molding die 130 through a runner 140, and is then forced under pressure through a tunnel gate 142 and into a mold cavity 144. The cavity 144 is defined by an upper interior mold cavity surface 146, a lower mold interior cavity surface 148, and the interior surfaces of the upper and lower recessed portions 42, 44. The upper mold half 134 and lower mold half 132 form a leak-proof seal around the recessed portions 42, 44 of the hydro-drawformed tubular member 12 and the exterior surface of the mounting sleeve 38. The injected molten rubber material R passes from the upper recessed portion 42 through the two or more holes 116 in the bottom wall portion 41 of the recessed portion 42, then through the two or more lower holes 120 in the bottom wall portion 47 of the recessed portion 44 and into the lower recessed portion 44. The molten shock absorbing material R is prevented from being forced into the internal confines of the vehicle frame member 12 by the annular sealing lip 22 provided by the previous operation illustrated in FIG. 9. The upper die half 134 and lower die half 132 remain in sealed engagement for a set time to allow the injected material R to cure or solidify. The mold 130 is then opened, and the finished hydro-drawformed vehicle frame member 10, with the integral shock absorbing mounting portion as shown in FIGS. 1 and 2, is removed from the injection molding tool 130.

The cured or solidified rubber shock absorbing material R filling recessed portion 42 forms the upper disk 15, while the shock absorbing material filling recessed portion 44 forms the lower disk 17. Because the disk portions 15, 17 are integrally connected through holes 116, 120, the disks 15, 17 are locked to the tubular member 12.

By using the above described invention, quality issues relating to the fit between the current shock mount separate component and hydroformed tube is eliminated and push-out failures are greatly reduced. There is also a reduction in the number of operations, thus reducing tooling costs and part costs.

It can thus be appreciated that the objects of the present invention have been fully and effectively accomplished. It is to be understood that the foregoing specific embodiment has been provided to illustrate the structural and functional principles of the present invention and is not intended to be limiting. To the contrary, the present invention is intended to encompass all modifications, substitutions and alterations within the spirit and scope of the appended claims.

It should be noted that limitations of the appended claims have not been phrased in the "means or step for performing a specified function" permitted by 35 U.S.C. § 112, ¶6. This is to clearly point out the intent that the claims are not to be interpreted under § 112, ¶6 as being limited solely to the structures, acts and materials disclosed in the present application or the equivalents thereof.

What is claimed is:

1. A method for making a motor vehicle frame member having a shock absorbing mounting portion comprising:
    disposing a tubular blank in a mold cavity of a hydro-forming die, said die having interior surfaces defining the mold cavity and a reciprocating drawforming member movable inwardly and outwardly with respect to said cavity;

supplying a substantially incompressible hydroforming fluid to an interior of said tubular blank;

pressurizing said fluid so as to expand said tubular blank against the interior surfaces defining said mold cavity to provide said blank with a shape generally defined by said interior surfaces;

moving said drawforming member inwardly with respect to said mold cavity so that said drawforming member deforms a portion of said tubular blank to form a recessed portion in said blank;

relieving the fluid pressure and removing the tubular blank from said hydroforming die;

disposing a mounting structure within said recessed portion, said mounting structure being constructed and arranged to be joined with another structural component of the motor vehicle;

disposing said tubular blank with said mounting structure within said recessed portion in an injection molding die;

injecting molten shock absorbing material so that said molten material substantially fills said recessed portion in surrounding relation to said mounting structure; and thereafter solidifying said molten shock absorbing material to secure said mounting structure in said recess.

2. A method according to claim 1, wherein said hydroforming die has a pair of said drawforming members movable inwardly with respect to said cavity generally towards one another and outwardly with respect to said cavity generally away from one another, and wherein moving said drawforming member inwardly with respect to said cavity comprises moving both said drawforming members inwardly with respect to said cavity generally towards one another so that said drawforming members deform generally opposing portions of said tubular blank inwardly toward one another and towards the interior of said blank to form a pair of generally opposing recessed portions each having an annular side wall portion and a bottom wall portion formed integrally with said annular side wall portion, said method further comprising:

forming an annular seal between said bottom wall portions;

forming openings through each of said bottom wall portions inwardly of said annular seal so as to communicate said recessed portions before disposing said blank and said mounting structure in said injection molding die;

said mounting structure being disposed inside both said recessed portions;

said tubular blank being disposed inside said injection molding die with said mounting structure inside both said recessed portions such that interior surfaces of both said recessed portions, said exterior surface of said mounting structure, interior surfaces of said injection molding die, and the annular seal formed between said bottom wall portions cooperate to form a sealed shock absorbing material receiving space;

said molten shock absorbing material being injected into said shock absorbing material receiving space so that said molten material flows through said openings formed in said bottom wall portions, surrounds said mounting structure and substantially fills said material receiving space; and said molten shock absorbing material being solidified so that solidified shock absorbing material inside one of said recessed portions is integrally connected to solidified shock absorbing material inside the other of said recessed portions.

3. A method according to claim 1, wherein the expanded tubular blank is removed from the hydroforming die before forming said annular seal.

4. A method according to claim 2, wherein both forming said annular seal and forming said openings are performed by engaging a punch tool with said bottom wall portions of said recessed portions such that (a) hole-forming portions of said tool cut through said bottom wall portions to form said openings, and (b) a seal-forming portion of said tool forms an annular sealing lip on one of said bottom wall portions and forces said annular sealing lip into sealed engagement with the other of said bottom wall portions.

5. A method according to claim 1, wherein prior to said supplying, the hollow interior of said tubular blank is sealed by sealing opposing longitudinal end portions of said tubular blank, said method further comprising:

pushing the opposing end portions of said tubular blank inwardly towards one another while pressurizing said fluid so as to maintain the wall thickness of said tubular blank within a predetermined range of its original thickness as said tubular blank is being expanded.

6. A method according to claim 5, wherein said opposing end portions of said tubular blank are sealed by engaging a pair of hydraulically driven rams in sealing relation with said opposing end portions and wherein said opposing end portions are pushed inwardly by driving said hydraulic rams inwardly with respect to said tubular blank as said tubular blank is being expanded, at least one of said hydraulic rams having a fluid supply port through which said fluid is delivered to the hollow interior of said tubular blank.

7. A method according to claim 1, wherein said fluid is pressurized to a peak pressurization level while said tubular blank is being expanded, said method further comprising:

reducing the fluid pressure to a selected pressure level lower than the peak pressure level after expanding said tubular member and before forming said recessed portions.

8. A method according to claim 1, wherein said drawforming members are hydraulically driven.

9. A method according to claim 8, wherein each of said drawforming members is a generally cylindrical piston and wherein the recessed portions are generally cylindrical.

10. A method according to claim 1, wherein said hydroforming die comprises first and second cooperating hydroforming die halves.

11. A method according to claim 1, wherein said injection molding die comprises first and second cooperating injection molding halves.

12. A method according to claim 2, wherein said mounting structure is a tubular mounting member and wherein said mounting structure is disposed inside each of said generally opposed recessed portions by inserting said tubular mounting member through one of said openings before disposing said tubular blank in said injection molding die.

13. A method according to claim 12, wherein said tubular mounting member is threaded internally.

14. A method according to claim 1, wherein said shock absorbing material is rubber.

15. A method according to claim 1, wherein the tubular blank is formed from steel.

* * * * *